US005977190A

United States Patent [19]

Lobo et al.

[11] Patent Number: 5,977,190

[45] Date of Patent: Nov. 2, 1999

[54] PROCESS FOR DEIONIZING AND CONCENTRATING EMULSIONS

[75] Inventors: Lloyd A. Lobo, Webster; Kenneth B. Quinn, Rochester, both of N.Y.

[73] Assignee: Eastman Kodak Company, Rochester, N.Y.

[21] Appl. No.: 09/007,084

[22] Filed: Jan. 14, 1998

[51] Int. Cl.[6] .......... B01J 13/00; G03C 1/025

[52] U.S. Cl. .......... 516/77; 210/705; 210/732; 430/569; 516/103; 516/136; 516/928

[58] Field of Search .......... 516/103, 928, 516/136, 77; 430/569; 210/732, 705

[56] References Cited

U.S. PATENT DOCUMENTS

| | | | |
|---|---|---|---|
| 2,525,753 | 10/1950 | Yutzy et al. | 260/117 |
| 2,565,418 | 8/1951 | Yackel | 430/569 |
| 2,614,928 | 10/1952 | Yutzy et al. | 430/569 |
| 2,691,582 | 10/1954 | Lowe et al. | 95/7 |
| 2,772,165 | 11/1956 | Moede | 430/628 |
| 3,178,294 | 4/1965 | Kinkel et al. | 430/628 |
| 3,455,694 | 7/1969 | Anderau et al. | 96/94 |
| 3,482,980 | 12/1969 | Hayakawa et al. | 96/94 |
| 3,782,953 | 1/1974 | Maley | 430/569 |
| 3,884,701 | 5/1975 | DePauw et al. | 430/628 |
| 4,087,282 | 5/1978 | Mitsui et al. | 96/94 R |
| 5,411,849 | 5/1995 | Hasegawa | 430/567 |
| 5,486,451 | 1/1996 | Vacca et al. | 430/569 |
| 5,523,201 | 6/1996 | Nimura et al. | 430/569 |
| 5,552,316 | 9/1996 | Savage | 210/705 X |
| 5,627,019 | 5/1997 | Vandenabeele et al. | 430/569 |

FOREIGN PATENT DOCUMENTS

| | | |
|---|---|---|
| 889760 | 4/1958 | United Kingdom . |
| 884840 | 10/1959 | United Kingdom . |
| 911886 | 2/1961 | United Kingdom . |
| 1121188 | 2/1966 | United Kingdom . |

OTHER PUBLICATIONS

Research Disclosure, Dec. 1989, No. 308119, pp. 993–1015.

Encyclopedia of Chemical Technology, by Kirk–Othmer, "Ion Exchange", 4th ed., vol. 14, pp. 737–783, (1995).

*Primary Examiner*—Richard D. Lovering
*Attorney, Agent, or Firm*—Arthur H. Rosenstein

[57] ABSTRACT

A process of washing an emulsion such as a silver halide emulsion which contains a hydrophilic colloid comprises deionizing the emulsion and coagulating the emulsion with an anionic polymer and separating the coagulum from the supernatant and resuspending the coagulum with hydrophilic colloid, water and a base.

24 Claims, 2 Drawing Sheets

PROCESS FOR DEIONIZING AND CONCENTRATING EMULSIONS

FIELD OF THE INVENTION

The invention relates to a method of deionizing and concentrating emulsions such as photographic emulsions. More particularly, the invention describes a process of a first efficient deionization step followed by a polymer coagulation step.

BACKGROUND OF THE INVENTION

Silver halide emulsions are generally made in solutions containing a low concentration of a colloid stabilizer. Generally, gelatin is found to be the most suitable stabilizer since it also serves as a film former in photographic coatings. The silver halide is a product of a double decomposition reaction of the respective halide of an alkali metal and silver nitrate. The resulting precipitation reaction results in a colloidal suspension of silver halide, which contains a considerable amount of water and high levels of salt (nitrates). In order to minimize drying loads during the coating operation, it is advantageous to remove water from the emulsion. Secondly, the high salt contents can impart deleterious properties to coating solutions and the coated products. Thus, some amount of deionization of the emulsion is required. Desalination and deionization of the emulsion can be achieved by several methods. Methods for deionization include dialysis, electrodialysis, ion exchange and washing of noodles. Methods for concentration include ultrafiltration and evaporation. A third method, coagulation, can achieve deionization and concentration simultaneously. Gelatin coagulants include derivatized gelatin, anionic polymers, inorganic salts, esters of phosphoric acid and dicarboxylic acids. Generally, these coagulants flocculate gelatin when the pH of the emulsion is decreased close to or below the isoelectric point of gelatin, which is 4.9 for lime processed ossein gelatin.

Anionic polymers as emulsion coagulants are the generally preferred type of coagulant. The coagulation procedure involves addition of polymer at levels from 2–50% with respect to the gelatin present. The pH is then lowered slightly below the coagulation point of the system. The separation of phases is effected by gravity or centrifugation. The supernatant containing water, salts and some gelatin is separated from the coagulate which contains the emulsion, gelatin and remaining salts. At this point, generally, not enough of the salt amount is removed from the emulsion. In order to remove the desired amounts of salts, the flocculated emulsion is washed with water in one or more subsequent steps. The deionized emulsion is then resuspended in water and gelatin by raising the pH above the isoelectric point of gelatin. As with all technologies, there are a few disadvantages with this method—1) the polymer coagulant remains with the emulsion and ends up in the coated product. This could result in potential problems, such as adversely affecting the sensitometric characteristics of the emulsion, viscosifying the coating melts etc. 2) Lowering and raising the pH to effect coagulation and resuspension, respectively, can have adverse effects. For example, the addition of base to an emulsion, frequently causes changes in the sensitometric characteristics, due to R-typing. Thus, the amount of base needed is inversely proportional to the pH of coagulation. A reduction in the amount of polymer required for coagulation and/or an increase in the pH of coagulation would be a desirable improvement on this technology. Another improvement would be to eliminate the need for multiple washing. Multiple washing requires a large amount of process time. Secondly, an emulsion that has been multiply washed and separated is found to be hard to resuspend. Specifically, small pieces of coagulum remain even after substantial mixing at the resuspension step.

The use of anionic polymers for concentrating emulsions is well known in the art. U.S. Pat. No. 2,772,165 discloses acid soluble polymers to coagulate emulsions. GB 884,840 discloses polystyrene sulfonate as a coagulating agent. Carboxylic acid containing polymers are disclosed in U.S. Pat. No. 2,565,418. Maleic acid copolymers with hydrophobic nonionic comonomers have been disclosed in U.S. Pat. No. 4,087,282, GB 1,121,188 and U.S. Pat. No. 5,411,849. Copolymers containing sulfonic acid and carboxylic acid groups have been disclosed in U.S. Pat. No. 5,486,451. All these polymers suffer from the above-mentioned problems, albeit to varying degrees. Anionic polymers containing amine groups, either on the same monomer as the anionic moiety or as a comonomer, are disclosed in U.S. Pat. No. 3,178,294; U.S. Pat. No. 3,455,694; U.S. Pat. No. 3,482,980; GB 889,760; and GB 911,886. These polymers are alleged to have a high pH of coagulation with gelatin. However, due to the interaction of both the anionic moiety and the amine group with gelatin, the dissolution of the coagulum is not easily achieved via pH control. Although, these polymers are able to raise the pH of coagulation, they still require relatively high amounts of polymer to achieve phase separation. U.S. Pat. No. 3,884,701 discloses the combination of an anionic polymer with phthalated gelatin as a coagulant for an emulsion prepared with regular gelatin, to reduce the amount of polymer that is needed. However, the process of derivatizing gelatin is relatively expensive and also the use of derivatized gelatin results in a large amount of variability to the coagulation process. None of the prior art disclosed above addresses the problem of having to carry out multiple washing steps.

SUMMARY OF THE INVENTION

It is an object of this invention to coagulate the emulsion by using a small amount of polymer and at a pH that is as high as possible. However, changes in these two variables run counter to each other, i.e., a lower polymer level results in a lower coagulation pH and vice versa. Another object of this invention is to achieve an emulsion of desired ionic strength and silver concentration without having to carry out multiple washing steps. Yet, another objective is to increase the ease of resuspending the coagulated emulsion. These objectives are achieved by carrying out an efficient deionization step prior to a second polymer coagulation step. First, the deionization step obviates the need to carry out multiple wash steps of the emulsion coagulate. Secondly, it is surprisingly found that the prior deionization step facilitates the coagulation step. That is, coagulation, which is carried out to obtain the required concentration of silver halide, can be achieved using a lower polymer level and/or at a higher pH. Thirdly, the emulsion coagulate is resuspended much more easily.

The prior art documents the use of ionic polymers with separation to concentrate and deionize emulsions. This is achieved by adding a required amount of polymer and lowering to a certain pH to coagulate and to cause phase separation. The supernatant is decanted and the remaining cake (which contains the emulsion) is washed one or more times with deionized water, to leach out the ions. Each wash is accomplished by a separation and decantation step. Finally, the emulsion is resuspended by adding requisite amount of gel, water and base.

This invention utilizes a combination of any well known deionization technique followed by a concentration step using coagulation/phase separation with ionic polymer as described above. The benefit in doing so (over the above prior art) is that the amount of polymer required is less than that of the prior art, the pH of phase separation is greater than that of the prior art and the moles of base needed to resuspend the emulsion is less than that of the prior art. In addition to reduction of cost in chemicals, these three results primarily alleviate the potential for adverse sensitometric effects. The other benefit in reducing the amount of polymer is the problems associated downstream in the manufacturing process. Specifically, consequences on emulsion viscosity, since ionic polymers are known viscosifiers of solutions/melts that contain gelatin, are a problem. An additional advantage is that the final resuspension step is achieved much more efficiently and easily by practicing the invention, than with the use of ionic polymers alone.

Thus, a process of deionizing and concentrating an emulsion comprises a multistep process for deionizing and concentrating an emulsion containing a hydrophilic colloid comprising: 1) a step that deionizes the emulsion, followed by a step 2) that involves adding an anionic polymer and lowering the pH of the emulsion to between 2 and 6 to cause coagulation of the emulsion, separating the coagulum from the supernatant, and resuspending the coagulum with hydrophilic colloid, water and base.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE INVENTION

Silver halide photographic emulsions are made by the double decomposition reaction between an alkali metal halide salt and silver nitrate. The precipitation is generally carried out in the presence of a hydrophilic colloid stabilizer to provide a good dispersion quality of the colloidal silver halide. Although several kinds of stabilizers can be used, gelatin is the most common, since it is used as the film forming binder in the final sensitized coatings. Due to the nature of the reaction and the concentrations of the reactant species, the final emulsion is dilute in silver halide and contains a high level of the reaction product, the alkali metal nitrate salt. Due to reasons stated above it is necessary to reduce the amount of salt and to concentrate the emulsion. The concentration of the emulsion is typically expected to be increased by a factor between 2 to 8. Usually, the concentration factor is between 2 to 4. The conductivity of the emulsion at the end of the precipitation step, which is the measure of the ionic content, is typically greater than 30 mS. The conductivity of the concentrated emulsion is typically desired to be <20 mS and more preferably <10 mS.

Figure 1:
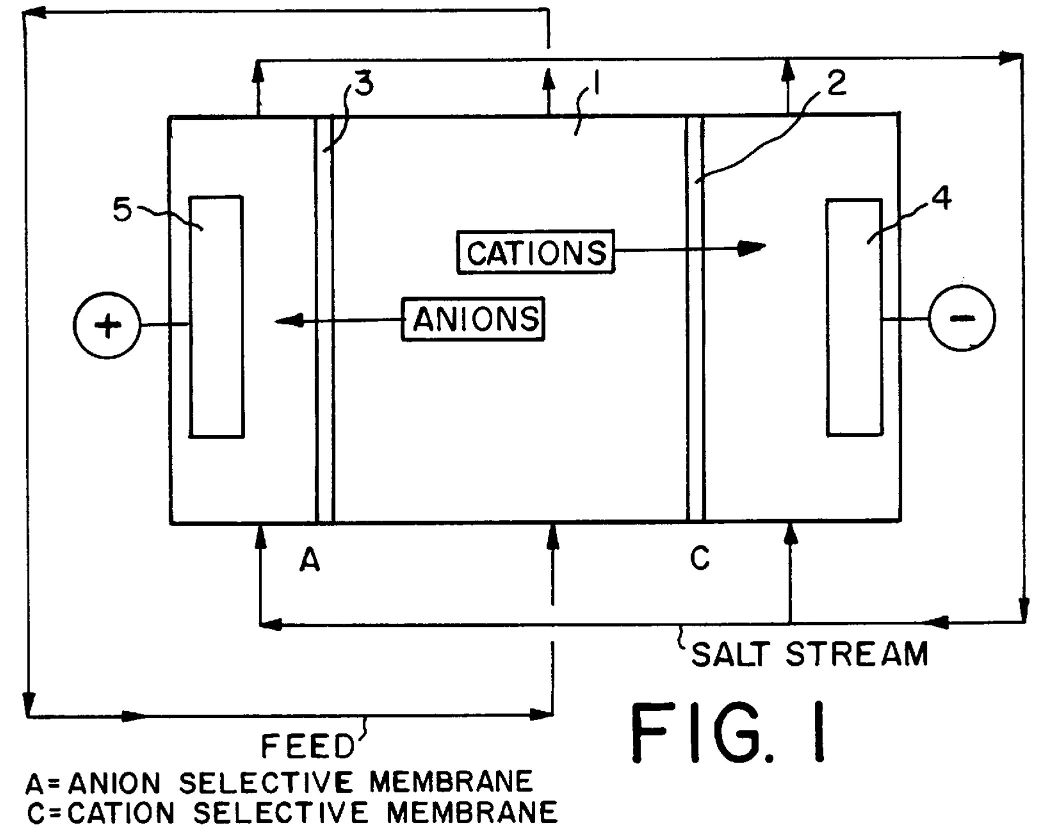
FIG. 1 is a view of a base unit of an electrodialysis cell.

The first step in the current invention is to deionize the emulsion using an efficient process. There are several methods by which an aqueous colloidal suspension can be deionized. They can be broadly divided into membrane separation processes and ion exchange processes. In order to separate salt from the colloidal suspension that contains gelatin, the nominal molecular weight cut-off of the membrane should be less than 50,000 and preferably less than 20,000. Because of this cut off, salt as well as water can pass through this membrane. There are several modes of operations by which salt can be removed through the membrane. The preferred modes are by dialysis, ultrafiltration and electrodialysis. In dialysis, the emulsion with the ions pass on one side of the membrane and distilled water on the other, and the ions leach out via diffusion through the membrane. Ultrafiltration is similar to dialysis except that the emulsion is under a higher pressure. The pressure applied across the membrane is between 100 and 200 psi. In this case, some amount of the water leaches out with the ions under the pressure gradient. However, the deionization rate is fastest at an optimum concentration of the emulsion, which is determined experimentally for each emulsion. Thus, water is generally replenished to maintain the emulsion concentration during the ultrafiltration process to achieve deionization at the fastest rate. In electrodialysis, the emulsion is deionized with the aid of an electric field and ion selective membranes. The basic unit (see FIG. 1) consists of a three chambered cell. The middle chamber 1 is bounded by two ion selective membranes 2, 3. The ion selective membrane may be selected from various kinds of commercially available membranes or membranes that are specially synthesized. The outer two chambers contain the two electrodes 4, 5 which are used to impose an electric field. The cation selective membrane is placed on the side which is adjacent to the chamber containing the cathode and the anion selective membrane is on the side of the anode. An electric field is applied across the two electrodes. The emulsion to be deionized (feed) is passed through the middle chamber and, on application of the electric field, the anions and cations will move towards their respective electrodes, through the ion selective membranes. The scale-up of this unit cell is achieved by stacking several such unit cells in parallel, with the electrodes placed in the two outermost chambers in the stack (see FIG. 2). The feed is passed through alternate chambers (odd numbered chambers in FIG. 2) and water through the even numbered chambers as described in U.S. Pat. No. 5,523,201. It is obvious that the salt ions will be driven through the membranes and trapped in the chambers that do not contain the feed. The emulsion is recirculated through the deionization unit until the desired amount of salt is removed. The voltage that is applied is typically 10–100 V.

In ion exchange processes, the emulsion is contacted with anionic exchange and cation exchange resins. Typical resins are copolymers of styrene/divinylbenzene or copolymers of acrylic or methacrylic acids (or their esters) with divinylbenzene. The ratio of the two monomers determine the degree of crosslinking and density of the resin. Cationic exchange resins are functionalized by sulfonate groups on the aromatic rings. These are the strong cation exchange resins. The weak cation exchange resins are functionalized by a carboxylic acid. Anion exchange resins are functionalized by amines. Weak anion exchange resins are functionalized by primary or secondary amines whereas strong anion exchangers are functionalized by tertiary amines which form quaternary ammonium groups. A general description of these resins and their preparation can be seen in the Kirk-Othmer Encyclopedia of Chemical Technology, 4th edition (Vol. 14, pg. 737–783). Generally, strong anion and cation exchangers are preferred to deionize emulsions since the major constituent of the salts is sodium nitrate. There are two choices of modes of deionization using resins. In the first mode the emulsion is sequentially deionized with the emulsion being preferably passed through the cation exchange column first, followed by the anion exchange column. The depleted columns are individually regenerated with a strong acid and a strong base respectively. The second mode is by using a mixed bed column where cations and anions are being exchanged at the same step. The resins need to be separated prior to being regenerated. The second mode is preferred because the first mode would give rise to large changes in emulsion pH during the deionization process.

This invention is related to any type of applicable deionization process and is not limited to the membrane processes and ion exchange processes. The amount of deionization of the emulsion, depends on the requirements for sensitizing and coating the final product. However, since the time and energy requirements are proportional to the extent of deionization, it is sometimes preferred to limit the deionization to the minimum acceptable value. Since the second concentration step by the ionic polymer also effects a certain amount of deionization, by virtue of removal of a salt containing water phase, the actual amount of deionization in the first step can be made such that the two steps, in combination, would remove the desired amount of salt, such that the emulsion is suitable for coating.

The second step in this invention is the coagulation of the emulsion, that has been partially or completely deionized in the first step, by use of anionic polymers. The polymer agents that are found to be useful can be broadly classified into 2 groups.

i) A synthetic water soluble polymer comprising at least 5 mole % of monomers having one or more pendant anionic moieties such as $—OSO_3M$, $—SO_3M$, —COOM, $—OP(OM)_3$, where M represents a hydrogen atom, a cation such as an alkali metal, an alkaline earth metal atom, a quaternary ammonium base etc.; and ii) Naturally occurring materials such as polysaccharides bearing pendant anionic moieties as described in i).

Generally, the anionic polymers useful in the present invention are well known in the art and some are commercially available. Typically they comprise synthetic water soluble homo or co-polymers bearing pendant ionic groups as described above. Examples of preferred polyelectrolytes include polystyrene sulfonate, polyacrylic acid, polymaleic acid, poly(vinyl toluene sulfonate), poly(styrene sulfonate-co-maleic acid), poly(vinyltoluene sulfonate-co-maleic acid), poly styrene carboxylate, poly(alkylvinyl ether-co-maleic acid), sulfated polyvinyl alcohol, poly(acrylamide-co-2-acrylamido-2methylpropane carboxylate), poly(styrene-co-acrylamide), poly acrylic acid, poly(styrene carboxylate-co-acrylamide), and poly(2-acrylamido-2methylpropane sulfonate-co-maleic acid).

The ability of the polymer to effect coagulation of the emulsion depends on the amount of ionic groups and the molecular weight of the polymer. The higher the value of both these parameters, the lower is the amount of polymer required. The amount of ionic monomer should be in the range from 20 to 100% on a mole basis. The preferred range is from 50–100% and the most preferred range is from 75–100%. Although a high molecular weight polymer is more effective, it will also increase the viscosity of the final emulsion, which could be problematic. Thus, a MW from 10,000 to 5,000,000 can be used for coagulation. However, due to viscosity concerns a preferred MW is from 10,000–500,000 and the most preferred range is from 10,000–100,000. The MW is determined by gel permeation chromatography and MW are reported as equivalent MW based on polystyrene sulfonate standards. Illustrative examples of other polymer coagulants are as follows:

[I]

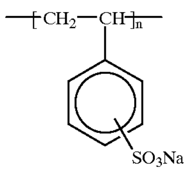

[II]

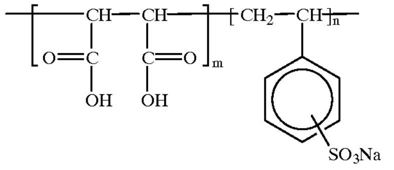

[III]

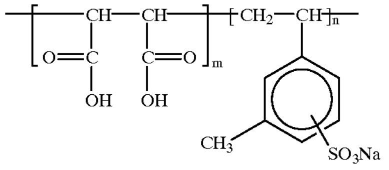

[IV]

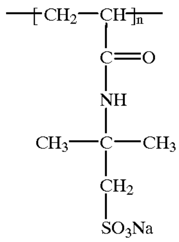

[V]

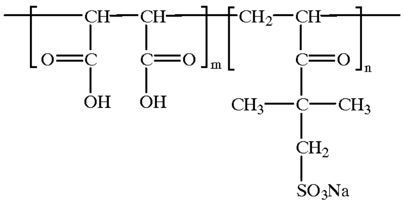

wherein m is the comonomer ratio and can change from 0-1.

[VI]

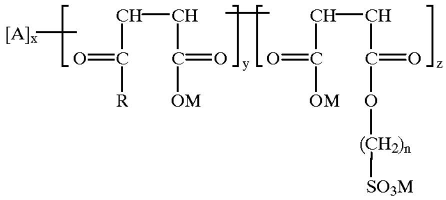

wherein R is an alkyl group, M is an alkali metal or hydrogen, and $$\frac{x}{y+z} = 0.8-0.2, \quad y/z = 0 \text{ to } 1$$

and n is 1–5.

[VII]

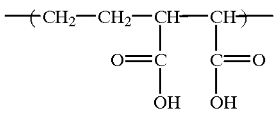

[VIII]

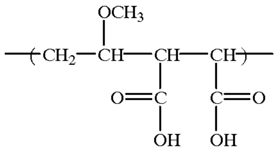

[IX]

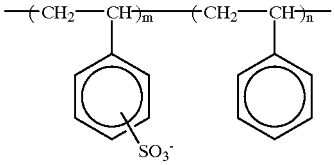

These ionic polymers may be purchased commercially or synthesized by copolymerizing the monomers as known in the art.

The polymer amount is added based on the amount of gelatin that is in the emulsion that is to be concentrated. The polymer amount (as a % of the total gelatin present) required, increases with the gelatin concentration and the amount of salt. Generally, the amount of polymer required is from 2 to 50% of the gelatin that is present. The preferred range is from 2 to 30%.

In order to effect the coagulation, the polymer/emulsion mixture must be brought to the pH of coagulation. This pH is generally around the isoelectric point of the gelatin (5.0) but coagulation can occur from pH range from 2.0 to 6.0. This change in pH can be effected by adding organic or mineral acids. The pH of coagulation depends on the amount of polymer and with higher levels of polymer the coagulation occurs at a higher pH. Due to the fact that the concentrated emulsion has to be eventually brought back to its original pH, which is usually above 5.0, a high pH of coagulation is desirable. The addition of base to restore the emulsion pH during resuspension is associated with detrimental sensitometric properties of the finished emulsion. Thus, it is preferred that the pH of coagulation be as close to 5.0 as possible. However, this is generally achieved by adding high levels of polymer which could also be detrimental to sensitometric properties as well as handling problems (such as viscosity, coatability, etc.). We have surprisingly found that by conducting a primary deionization step, the phase boundary is changed in a beneficial manner. That is, upon deionization, a lower amount of polymer can be used and at the same time the pH of coagulation is increased.

In the embodiments of the invention, after the polymer coagulant is added, the pH thereof is adjusted so as to cause to coagulate the silver emulsion. The pH for coagulating the emulsion is within the range of 2.0 to 5.5 and, preferably, 3.8 to 5.0.

There is no special limitation to an acid applicable to a pH control. However, it is preferable to use an organic acid such as acetic acid, citric acid and salicyclic acid or an inorganic acid such as hydrochloric acid, nitric acid, sulfuric acid and phosphoric acid. It is also allowed to make combination use of the polymeric coagulant and a heavy-metal ion such as magnesium ion, cadmium ion, lead ion and zirconium ion.

The amount of polymer required and the pH of phase separation, is also sensitive to the gelatin concentration, with lower gelatin concentration being favorable. Thus it may also be beneficial to dilute the emulsion with deionized water prior to carrying out the step of coagulation.

The hydrophilic colloid is preferably normal gelatin or other known photographic hydrophilic colloid such as gelatin derivatives as referred to above, albumin, casein, cellulose derivatives, such as hydroxyethyl cellulose and carboxymethyl cellulose, polyvinyl alcohol, polyacrylamide, etc. Gelatin may be base processed such as lime processed gelatin whose isoelectric point (IEP) is around 5. It may also be acid processed ossein (IEP around 7) or acid processed skin gelatin (IEP around 9).

Acid-coagulable gelatin derivatives are reaction products of gelatin with organic carboxylic or sulfonic acid chlorides, carboxylic acid anhydrides, aromatic isocyanates or 1:4-diketones. Gelatin derivatives obtained by reaction with acid chlorides or acid anhydrides especially phthaloyl gelatin, are preferably used. N-phenylcarbamoyl gelatin is also very suitable for use in accordance with the present invention.

In the invention, where a gelatin flocculant is used in addition to high-molecular flocculant, preferably used is a derivatized gelatin having the 50% or more substituted amino groups of the gelatin molecules. Examples of the substituent to the amino group are described in U.S. Pat. Nos. 2,691,582; 2,614,928; and 2,525,753.

Those useful substituents include:

1. an acyl groups such as alkylacyl, arylacyl, acetyl and benzoyl,
2. a carbamoyl groups such as alkylcarbamoyl and arylcarbamoyl,
3. a sulfonyl groups such as alkylsulfonyl and arylsulfonyl,
4. a thiocarbamoyl groups such as alkylthiocarbamoyl and arylthiocarbamoyl,
5. a straight-chain or branched alkyl group having 1 to 18 carbon atoms, and
6. an aryl group such as an aromatic heterocyclic group, phenyl and naphthyl.

The preferred one thereof is an acyl group ($—COR^1$) or a carbamoyl group.

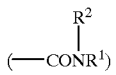

wherein $R^1$ represents an aliphatic group such as an alkyl or allyl group each having 1 to 18 carbon atoms, an aryl group or an aralkyl group such as phenethyl; and $R^2$ represents a hydrogen atom, an aliphatic group, an aryl group, or an aralkyl group.

Preferably, $R^1$ is an aryl group and $R^2$ is a hydrogen atom.

The examples of the gelatin flocculant used in conjunction with a high-molecular weight ionic polymer in the invention are shown below with the substituent to the amino group thereof:

SUBSTITUENTS TO THE AMINO GROUP

G-1

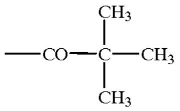

G-2

—$COCH_3$

G-3

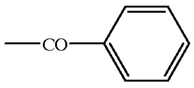

By lowering the pH, the silver halide emulsion forms floccules which settle to form a coagulum. The coagulum thus formed may be separated from the liquid by any suitable technique, such as for example by removing the supernatant mother liquid by decantation or by means of a siphon.

The phase separation step can be carried out in several ways. Under gravity, the emulsion/polymer mixture is simply allowed to stand in a quiescent condition. After the appropriate time, a clear top phase is decanted out leaving a concentrated emulsion behind. Under forced gravity methods, centrifuges, hydrocyclones, and centrifugal decanters may be employed in a continuous or batch mode to separate the clear top phase and a concentrated emulsion phase.

In the instant invention the primary deionization step removes the desired amount of salts. However, in the absence of the primary deionization step, it is usually necessary to further reduce the content of water soluble salts which may be present, using several methods. For example, the coagulum may be washed out with cold water (which may be demineralized or not) once or several times. Alternatively, washing may be effected by redispersing the coagulum in water using a small amount of alkali, e.g. sodium or ammonium hydroxide, at elevated temperatures, recoagulating by addition of acid and subsequently removing the supernatant liquid. This procedure of redispersion and recoagulation may be repeated as many times as necessary. However, by using the instant invention, the need for multiple washing steps is obviated.

The coagulum may be finally redispersed in a hydrophilic colloid, to produce a composition suitable for finishing and coating operations of a photographic emulsion. Redispersion is usually effected by treating the coagulum, at a temperature preferably between about 35° C. and about 60° C., with water, a hydrophilic colloid and, if necessary, alkali until a pH value of 4.5–8 is reached, for a time sufficient to redisperse the coagulum. The base may also be mixed in with the gelatin. The resuspension step is carried out by stirring or mechanical agitation.

In the invention, gelatin used as a protective colloid may be derived from lime or acid treatment. The details of preparation of gelatin are described in Arthur Vice, "The Molecular Chemistry of Gelatin" (Academic Press, 1964). The polymer coagulant may also be used together with acid coagulable gelatin.

The silver halide photographic emulsions prepared according to the method of the present invention may be digested or chemically sensitized according to any of the methods known in the art of photography, such as those disclosed in Research Disclosure 308119, December 1989, page 996. Before coating on a support, the silver halide emulsion may be added with one or more coating additives known in the art, such as spectral sensitizers, brighteners, antifoggants and stabilizers, color formers, absorbing dyes, hardeners, coating aids, plasticizers and lubricants, antistatic agents, matting agents, development modifiers, etc. such as those described in Research Disclosure 308119, December 1989.

The silver halide photographic emulsions prepared according to the method of the present invention may be coated onto the various types of supports known in the art such as, for example, glass, paper, metal, polymeric films such as cellulose acetate, polycarbonate, polystyrene, polyethylene terephthalate, polyvinyl acetate, etc., as described in Research Disclosure 308119, December 1989, page 1009.

Any of the customarily employed washed emulsions can be prepared by the present method, e.g., silver bromide, silver bromoiodide, silver chlorobromoiodide, silver chloride, silver chloroiodide, etc., emulsions.

In this invention the emulsion is ready for sensitization and coating after the resuspension step. The benefits of this invention are listed as follows: by combining a primary deionization step, the amount of polymer that is required and thereby remain with the emulsion, is reduced and the pH of phase separation is closer to 5.0. Both these effects, reduce the potential detrimental impact on the sensitometric properties of the emulsion. In the absence of the primary deionization step, it is generally necessary to wash the separated emulsion with water several times, before finally resuspending. This is required to achieve the requisite deionization. This requires a great deal of time because phase separation and decantation has to be carried out after every wash step. Thus, the combination of an efficient deionization step with a coagulation step using ionic polymers, can cut down the time and labor involved in preparing the emulsion. Secondly, with every wash step, there is some amount of silver lost, since decantation is not inherently efficient. Also, it is surprisingly found that resuspension of the coagulum is easier and more efficient.

EXAMPLE 1

A silver halide cubic emulsion EM0, containing 70 mol % chloride and 30 mol % bromide ions was prepared by the conventional double-jet precipitation procedures (see U.S. Pat. No. 5,523,201). The emulsion grains were found to be monodisperse with an average size of 0.15 μm. At the end of the precipitation the emulsion had the following composition: per Kg of emulsion; 0.5794 moles of silver halide; 17.22 g of type IV gelatin; and 0.633 moles of $NaNO_3$. The conductivity of the emulsion was 50 mS and the pH was 5.3. The emulsion was divided into three batches of 500 g each EM1, EM2 and EM3. EM1 was left undeionized. EM2 and EM3 were treated with a mixed bed deionizing resin. The resin, M150 (styrene/divinyl benzene) is manufactured by Rohm and Haas and consists of 40% strong cation exchange groups and 60% strong anion exchange groups. EM2 was treated with the resin until its conductivity dropped to 20 mS. EM1 was treated with the resin until its conductivity reached 4 mS. To 100 g each of these emulsions, was added varying amounts of a 25% polymer solution of TL-7069. TL-7069 is a product obtained from National Starch and Chemical Co. and is a copolymer of styrene sulfonate and maleic acid in the weight ratio 3:1. Its Molecular weight is reported as 100,000.

Each emulsion was coagulated by adding 1.6 N nitric acid. The pH of the emulsion was reduced to 0.1 units below the observed pH of coagulation. The coagulated emulsion was allowed to stand in a quiescent manner. The clear top phase was decanted. The weight of the decant was measured. The gelatin concentration in the decant was also measured, in order to obtain the following composition, which is desired for sensitization and coating of the emulsion: per Kg of emulsion; 1.43 moles of silver halide; 42.85 gms of gelatin; and the conductivity of the emulsion is required to be <10 mS. The emulsion was resuspended by stirring and addition of 1 N sodium hydroxide. The conductivity of the final reconstituted and resuspended emulsions was measured. Table 1 shows the measurements made during the coagulation step, decantation and reconstitution:

TABLE 1

| Emulsion | g of Polymer solution | ml 1.6 N acid added | pH of coagulation | weight of decant (g) | g gel added | g water added | ml 1N base added | conductivity (mS) |
|---|---|---|---|---|---|---|---|---|
| EM1 | 0.704 | 0.711 | 3.6 | 79.4 | 0.854 | 19.1 | 0.55 | 19.8 |
| EM2 | 0.704 | 0.348 | 4.2 | 80.8 | 0.41 | 20.9 | 0.265 | 7.8 |
| EM3 | 0.35 | 0.236 | 4.5 | 78 | 0.736 | 17.81 | 0.3 | 2.6 |

As can be seen from the results, when the extent of deionization is increased the amount of polymer required decreases (EM2 to EM3) and the pH of coagulation increases (EM1 to EM2 to EM3). If no prior deionization is performed, the single step coagulation (EM1) fails to achieve the conductivity specification of <10 mS. Whereas, for the two emulsions that are deionized, a single coagulation step is able to achieve the requisite amount of deionization. It is also seen that the amount of base needed to resuspend the emulsion is decreased if the emulsion is deionized (EM1 to EM2 and EM3). This reduces the potential for detrimental sensitometric effects.

EXAMPLE 2

Figure 3A:
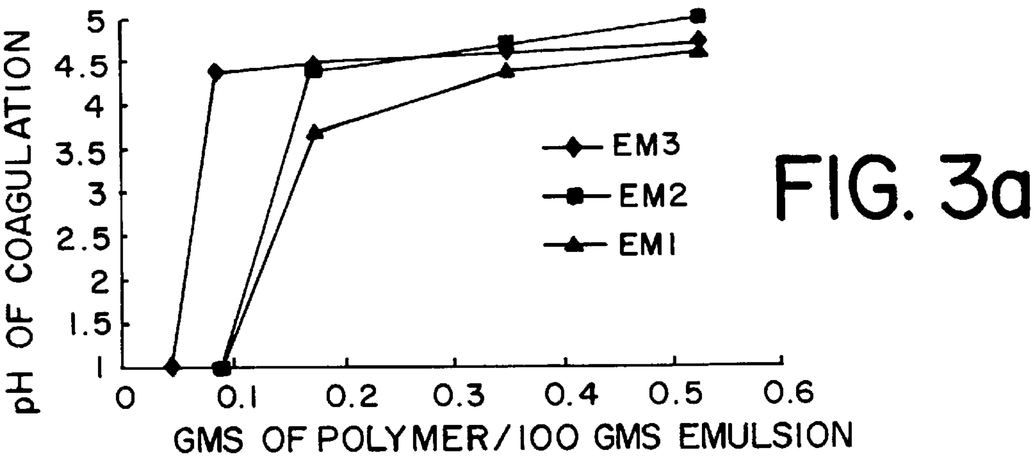
FIGS. 3*a, b* and *c* are graphs of the pH of coagulation versus grams of polymer used in the invention (related to example 2).

Emulsions EM1, EM2 and EM3 were prepared as described in Example 1. To 100 g portions of each emulsion, varying amounts of three different polymers were added. The three polymers were Versa TL-7069, Versa TL-70 and Narlex D-81. The chemical composition of each polymer is given below. For each emulsion polymer mixture, 1.6 N nitric acid was added until the emulsion was observed to coagulate and separate. The pH of phase separation was noted down. Table 2 shows the amounts of acid added and the pH of coagulation. FIGS. 3*a, b, c* show the pH of coagulation as a function of polymer level for the three polymers.

TABLE 2

| Emulsion | Emulsion Weight (g) | Polymer Used | Conc. of polymer solution % | g of polymer solution | g polymer | ml of 1.6 N acid | coagulation pH |
|---|---|---|---|---|---|---|---|
| EM3 | 100 | Versa TL70 | 10 | 5.28 | 0.528 | 0.284 | 4.7 |
| EM3 | 100 | Versa TL70 | 10 | 3.52 | 0.352 | 0.227 | 4.6 |
| EM3 | 100 | Versa TL70 | 10 | 1.76 | 0.176 | 0.188 | 4.5 |
| EM3 | 100 | Versa TL70 | 10 | 0.88 | 0.088 | 0.277 | 4.4 |
| EM3 | 100 | Versa TL70 | 10 | 0.44 | 0.044 | 0.958 | <2.5 |
| EM3 | 100 | Narlex D-81 | 10 | 5.28 | 0.528 | 0.426 | 4.4 |
| EM3 | 100 | Narlex D-81 | 10 | 3.52 | 0.352 | 0.306 | 4.5 |
| EM3 | 100 | Narlex D-81 | 10 | 1.76 | 0.176 | 0.281 | 4.3 |
| EM3 | 100 | Narlex D-81 | 10 | 1.32 | 0.132 | 0.302 | 4.5 |
| EM3 | 100 | Narlex D-81 | 10 | 0.88 | 0.088 | 1.06 | <2.5 |
| EM3 | 100 | TL-7069 | 25 | 2.11 | 0.528 | 0.140 | 4.9 |
| EM3 | 100 | TL-7069 | 25 | 1.41 | 0.352 | 0.096 | 4.9 |
| EM3 | 100 | TL-7069 | 25 | 0.704 | 0.176 | 0.144 | 4.6 |
| EM3 | 100 | TL-7069 | 25 | 0.35 | 0.088 | 0.236 | 4.5 |
| EM3 | 100 | TL-7069 | 25 | 0.175 | 0.044 | 0.958 | <2.5 |
| EM2 | 100 | Versa Th70 | 10 | 5.28 | 0.528 | 0.08 | 5.1 |
| EM2 | 100 | Versa TL70 | 10 | 3.52 | 0.352 | 0.49 | 4.7 |
| EM2 | 100 | Versa TL70 | 10 | 1.76 | 0.176 | 0.75 | 4.4 |
| EM2 | 100 | Versa TL70 | 10 | 0.88 | 0.088 | 0.97 | <2.5 |
| EM2 | 100 | Narlex D-81 | 10 | 5.28 | 0.528 | 0.618 | 3.9 |
| EM2 | 100 | Narlex D-81 | 10 | 3.52 | 0.352 | 0.613 | 3.9 |
| EM2 | 100 | Narlex D-81 | 10 | 1.76 | 0.176 | 0.789 | 3.5 |
| EM2 | 100 | Narlex D-81 | 10 | 1.35 | 0.135 | 1.076 | <2.5 |
| EM2 | 100 | TL-7069 | 25 | 2.11 | 0.528 | 0.217 | 4.7 |
| EM2 | 100 | TL-7069 | 25 | 1.41 | 0.352 | 0.243 | 4.6 |
| EM2 | 100 | TL-7069 | 25 | 0.704 | 0.176 | 0.348 | 4.2 |
| EM2 | 100 | TL-7069 | 25 | 0.352 | 0.088 | 0.97 | <2.5 |
| EM1 | 100 | Versa TL70 | 10 | 5.3 | 0.528 | 0.186 | 4.6 |

TABLE 2-continued

| Emulsion | Emulsion Weight (g) | Polymer Used | Conc. of polymer solution % | g of polymer solution | g polymer | ml of 1.6 N acid | coagulation pH |
|---|---|---|---|---|---|---|---|
| EM1 | 100 | Versa TL70 | 10 | 3.5 | 0.352 | 0.293 | 4.38 |
| EM1 | 100 | Versa TL70 | 10 | 1.76 | 0.176 | 0.263 | 4.1 |
| EM1 | 100 | Versa TL70 | 10 | 0.88 | 0.088 | 1.09 | <2.5 |
| EM1 | 100 | Narlex D-81 | 10 | 5.28 | 0.528 | 1.133 | 3.3 |
| EM1 | 100 | Narlex D-81 | 10 | 3.52 | 0.352 | 1.048 | 3.3 |
| EM1 | 100 | Narlex D-81 | 10 | 1.76 | 0.176 | 1.134 | 2.7 |
| EM1 | 100 | Narlex D-81 | 10 | 0.88 | 0.088 | 1.074 | <2.5 |
| EM1 | 100 | TL-7069 | 25 | 2.112 | 0.528 | 0.585 | 4.1 |
| EM1 | 100 | TL-7069 | 25 | 1.408 | 0.352 | 0.570 | 4 |
| EM1 | 100 | TL-7069 | 25 | 0.704 | 0.176 | 0.711 | 3.6 |
| EM1 | 100 | TL-7069 | 25 | 0.352 | 0.088 | 1.066 | <2.5 |

The polymer properties as reported by National Starch and Chemical Co. are as follows: Versa TL70-polystyrene sulfonate, MW=70,000; Narlex D-81-poly(styrene sulfonate co maleic anhydride) (1:1 ratio of comonomers), MW=15,000; TL7069-poly(styrene sulfonate co maleic anhydride) (1:1 ratio of comonomers), MW=100,000.

The points which show a pH of coagulation of 1.0 are actually emulsions that cannot be coagulated under those conditions, by changing pH. This is used to illustrate the minimum amount of polymer that is needed in order to achieve any coagulation.

Figure 3B:
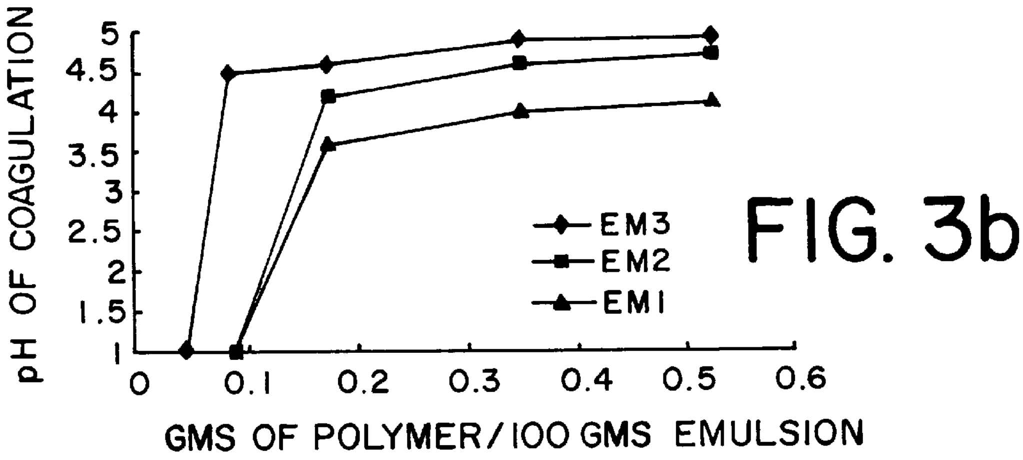
Figure 3C:
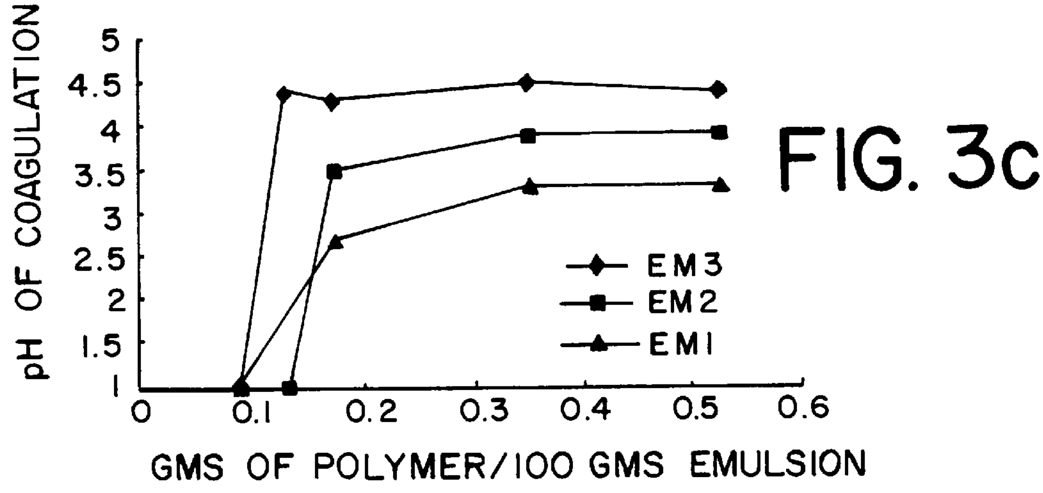

As can be seen in the table and FIG. 3, if the emulsion is deionized to some degree compared with the native emulsion (EM1), the pH of coagulation is increased and less amount of acid is required. As seen in Example 1, the higher the pH of coagulation, the smaller is the amount of base that is needed to resuspend the emulsion. This reduces the potential for detrimental sensitometric effects that are seen when base is added to an emulsion. A second advantage is that the minimum amount of polymer, that is needed for coagulation, is smaller for the emulsions that are deionized. Thus, the amount of polymer that is associated with the final emulsion product is lower if the invention is practiced. This again reduces the concern for potential detrimental sensitometric effects associated by the presence of the polymer. Also less polymer means that the viscosity of the final emulsion will also be lower. For all the polymers, both these advantages are shown simultaneously, that is the minimum amount of polymer required is reduced and the pH of coagulation at the minimum polymer level, is higher for emulsions that are deionized.

EXAMPLE 3

An emulsion EM4, which is a 100% chloride cubic emulsion was prepared by the conventional double jet precipitation techniques. The emulsion grain size was found to have an average of 0.75 μm. At the end of the precipitation the emulsion had the following composition: per Kg of emulsion; 0.714 moles of silver halide; 14.28 g of type IV gelatin; and 0.73 moles of $NaNO_3$. The conductivity of the emulsion was 64 mS and the pH was 5.3.

Figure 2:
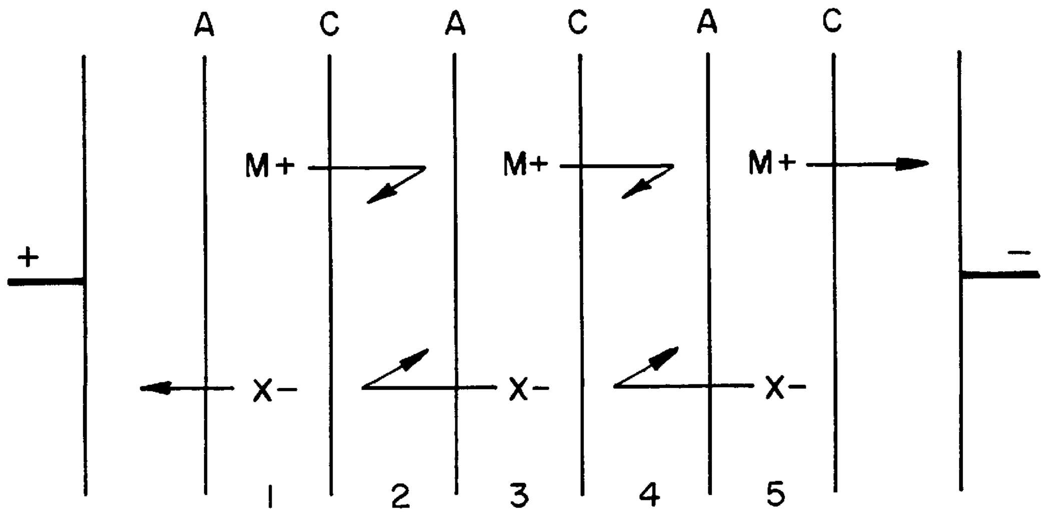
FIG. 2 is a view of unit cells in parallel.

The emulsion was deionized in an electrodialysis unit similar to the schematic shown in FIG. 2. A 10 cell pair unit was used, which had a cumulative membrane area of 0.1 $m^2$. A cell voltage of 20 V was applied across the unit. 2 L of EM4 was circulated through the unit for 60 minutes until the conductivity reached a value of 12 mS. The product emulsion EM5 was divided into batches of 100 g to which the three polymers described in Example 2 were added at a level which corresponded to 10% of the amount of gelatin in the emulsion. The emulsion which was not deionized was used as the check. 1.6 N nitric acid was added to each mixture until coagulation was visibly observed. The pH of coagulation was noted. Table 3 shows the results.

TABLE 3

| Emulsion | Process for Deionization | g of Emulsion | Polymer Added | g of Polymer | ml of 1.6 N nitric acid to coagulate | pH of coagulation |
|---|---|---|---|---|---|---|
| EM4 | none | 100 | Versa TL70 | 0.134 | 0.335 | 3.9 |
| EM4 | none | 100 | Narlex D-81 | 0.134 | 0.713 | 3.2 |
| EM4 | none | 100 | TL-7069 | 0.134 | 0.492 | 3.8 |
| EM5 | ED | 100 | Versa TL70 | 0.134 | 0.342 | 4.2 |
| EM5 | ED | 100 | Narlex D-81 | 0.134 | 0.43 | 4.1 |
| EM5 | ED | 100 | TL-7069 | 0.134 | 0.314 | 4.3 |

*ED refers to the process of electrodialysis

As seen in the above Table 3, by using the invention, the pH of coagulation is raised for the same level of polymer, compared with the check emulsion which is not deionized. Although, the pH differences between the check emulsion and the invention are not the same for all polymers, the pH is always higher when a deionization process, such as ED, is used prior to coagulating with the polymers.

EXAMPLE 4

A silver halide cubic emulsion EM6, containing 70 mol % chloride and 30 mol % bromide ions was prepared by the conventional double-jet precipitation procedures, similar to EM0. The emulsion grains were found to be monodisperse with an average size of 0.15 μm. At the end of the precipitation the emulsion had the following composition per kg of emulsion; 0.5794 moles of silver halide, 11.56 gms of type IV gelatin, 0.633 moles of $NaNO_3$. The conductivity of the emulsion was 50 mS and the pH was 5.3. One half of the emulsion EM6 was subjected to ultrafiltration (UF) using a 20,000 nominal MW cut off membrane. The conductivity of the product emulsion (EM7) at the end of the UF process was 7 mS. Water was added to EM7 to achieve a similar silver halide concentration of EM6 as given above. The gelatin concentration was similar to EM6. To 600 gms each of EM6 and EM7, 3.5 gms. of Versa-TL77 was added. Versa-TL77 is a 30% solution of a 70,000 MW polystyrene sulfonate polymer. Acid was added to lower the pH of each emulsion to 0.1 units below the observed pH of coagulation. The emulsions were allowed to stand for 45 minutes. The clear top phase was decanted for each emulsion. For EM6 a second wash step was carried out by adding back the same amount of deionized water as the amount of decant removed, stirring, allowing the coagulum to settle and decanting the clear top phase again. Gelatin, water and base was added to each emulsion to achieve the following composition that was required for sensitization: per kg of emulsion, 1.43 moles silver halide, 42.89 gms of gelatin, pH of 5.6. The emulsions were stirred to resuspend the emulsion

TABLE 4

| Emulsion | | ml 1.6N acid added | pH of coagula-tion | weight of decant gms | gms gel added | gms water added | No. of inter-mediate wash steps | ml 1N base added | conductivity mS |
|---|---|---|---|---|---|---|---|---|---|
| EM6 | control | 2.2 | 4.0 | 420 | 2.5 | 73 | one | 2.7 | 9.0 |
| EM7 | inv. | 0.7 | 5.1 | 383 | 2.65 | 27.6 | none | 1.2 | 4.5 |

Table 4 shows that the pH of coagulation for the invention is substantially higher than the control. Consequently the amount of acid and base needed to be added is much less for the invention. Since the invention was deionized prior to coagulation a second wash step was not necessary, as it was for the control. Also, the resuspension of the EM7 was much easier and more efficient as evidenced by the absence of clumps of coagulum, which was observed with the control (EM6).

The invention has been described in detail with particular reference to certain preferred embodiments thereof, but it will be understood that variations and modifications can be effected within the spirit and scope of the invention.

What is claimed is:

1. A multistep process for deionizing and concentrating an emulsion containing a hydrophilic colloid comprising: 1) deionizing the emulsion and 2) adding an anionic polymer having a molecular weight between 10,000 and 500,000 which contains at least 5 mole % of monomers which contain an anionic group and is formed from one of the moieties, $—OSO_3M$, $—SO_3M$, —COOM, $—OP(OM)_3$, where M represents a hydrogen atom, an alkali metal atom, an alkaline earth metal atom, or a quaternary ammonium base, concentrating the emulsion by coagulating the emulsion by lowering the pH of the emulsion to between 2 and 6, separating the coagulum from the supernatant and resuspending the coagulum with hydrophilic colloid, water and base, wherein the polymer level is 2 to 50% by weight of the hydrophilic colloid present and the pH of coagulation is at least higher 0.1 unit or the polymer amount is reduced by when compared to the process practiced in the absence of the first deionization step.

2. The process of claim 1 where the deionization process in step 1) is carried out by ultrafiltration.

3. The process of claim 1 where the deionization process in step 1) is carried out by dialysis.

4. The process of claim 1 where the deionization process in step 1) is carried out by electrodialysis.

5. The process of claim 1 where the deionization process in step 1) is carried out using ion exchange resins.

6. The process of claim 5 where a mixed bed resin is used in step 1).

7. The process of claim 1 where the emulsion is deionized, in step 1), to its final ionic content.

8. The process of claim 1 where the deionization in step 1) is partial such that the ionic content in the emulsion after step 2) is the final desired ionic content.

9. The process of claim 1 wherein the polymer has a molecular weight between 10,000 and 100,000.

10. The process of claim 1 wherein the polymer is polystyrene sulfonate.

11. The process of claim 1 wherein the polymer is a copolymer of styrene sulfonate and maleic anhydride.

12. The process of claim 1 wherein the polymer is a copolymer of vinyl toluene sulfonate and maleic anhydride.

13. The process of claim 1 wherein the emulsion is diluted by a factor from 0.5 to 10 times by weight, with deionized water, prior to carrying out step 2).

14. The process of claim 1 wherein the separation of the coagulum in step 2) is carried out by gravity sedimentation and decantation.

15. The process of claim 1 wherein the separation of the coagulum in step 2) is carried out by centrifuging the coagulated emulsion.

16. The process of claim 1 wherein the separation of the coagulum in step 2) is carried out by the use of a hydrocyclones.

17. The process of claim 1 wherein the hydrophilic colloid is gelatin.

18. The process of claim 17 wherein the gelatin has an isoelectric point <5.0.

19. The process of claim 17 wherein the gelatin has an isoelectric point >7.0.

20. The process of claim 17 wherein all or some of the gelatin comprises an acid-coagulatable gelatin derivative.

21. The process of claim 1 wherein the polymer is added at a level from 2 to 20% by weight of the amount of the hydrophilic colloid present.

22. The process of claim 1 wherein the emulsion is a silver halide emulsion.

23. The process of claim 1 wherein the anionic polymer is a naturally occurring polymer.

24. The process of claim 23 wherein the naturally occurring polymer is a polysaccharide.

* * * * *

UNITED STATES PATENT AND TRADEMARK OFFICE
CERTIFICATE OF CORRECTION

PATENT NO. : 5,977,190
DATED : November 2, 1999
INVENTOR(S) : Lloyd A. Lobo, et. al.

It is certified that error appears in the above-identified patent and that said Letters Patent is hereby corrected as shown below:

Column 6, line 52, should read --"wherein m/n is the comonomer ratio and can change from 0-1".

Signed and Sealed this

Twenty-fifth Day of July, 2000

Attest:

Q. TODD DICKINSON

Attesting Officer

Director of Patents and Trademarks